(12) United States Patent
Rutan (10) Patent No.: US 7,540,145 B2
(45) Date of Patent: Jun. 2, 2009

(54) UNITIZED HYBRID ROCKET SYSTEM

(75) Inventor: Elbert L. Rutan, Mojave, CA (US)

(73) Assignee: Mojave Aerospace Ventures, LLC, Seattle, WA (US)

( * ) Notice: Subject to any disclaimer, the term of this patent is extended or adjusted under 35 U.S.C. 154(b) by 787 days.

(21) Appl. No.: 10/516,828

(22) PCT Filed: Mar. 29, 2004

(86) PCT No.: PCT/US2004/009694

§ 371 (c)(1),
(2), (4) Date: Nov. 1, 2005

(87) PCT Pub. No.: WO2004/085252

PCT Pub. Date: Oct. 7, 2004

(65) Prior Publication Data

US 2006/0145018 A1  Jul. 6, 2006

Related U.S. Application Data

(60) Provisional application No. 60/458,296, filed on Mar. 28, 2003.

(51) Int. Cl.
F02K 9/28 (2006.01)
(52) U.S. Cl. .................. 60/251; 60/253; 244/171.1
(58) Field of Classification Search .............. 60/251, 60/253; 244/171.1, 172.3
See application file for complete search history.

(56) References Cited

U.S. PATENT DOCUMENTS

| | | | | |
|---|---|---|---|---|
| 3,068,641 A | * | 12/1962 | Fox | 60/207 |
| 3,097,766 A | | 7/1963 | Biehl et al. | |
| 3,178,885 A | * | 4/1965 | Loughran | 60/251 |
| 3,354,647 A | | 11/1967 | Aycock | |
| 3,568,448 A | * | 3/1971 | Webb, Jr. | 60/250 |
| 3,969,812 A | * | 7/1976 | Beck | 29/421.1 |
| 4,504,530 A | * | 3/1985 | Bliley | 428/36.1 |
| 4,561,568 A | | 12/1985 | Hoffmeister et al. | |
| 4,577,542 A | * | 3/1986 | O'Driscoll | 86/20.12 |
| 4,631,916 A | * | 12/1986 | Le Tanter et al. | 60/245 |
| 5,070,691 A | * | 12/1991 | Smith et al. | 60/245 |
| 5,101,623 A | | 4/1992 | Briley | |
| 5,119,627 A | | 6/1992 | Bradford et al. | |
| 5,341,638 A | | 8/1994 | Van Name et al. | |
| 5,613,358 A | * | 3/1997 | Humiston et al. | 60/250 |
| 5,715,675 A | | 2/1998 | Smith et al. | |

(Continued)

OTHER PUBLICATIONS

International Search Report for International PCT Application No. PCT/US2004/09694, dated Sep. 27, 2004, pp. 8.

*Primary Examiner*—William H Rodriguez
(74) *Attorney, Agent, or Firm*—Christie, Parker & Hale, LLP.

(57) ABSTRACT

The hybrid rocket system of this invention is characterized by use of an oxidizer tank having a cylindrical midsection surrounded by a skirt and bonded thereto by a layer of elastomeric adhesive. The skirt outer surface is in turn adhesively secured to a spacecraft inner surface. An elongated solid-fuel motor case is mechanically rigidly secured to a central rear surface of the tank, and the case terminates in a throat and nozzle. The elastomeric-adhesive bonding of tank to skirt, and rigid adhesion of skirt to spacecraft forms the sole support for the rocket system, and separate support for the motor case is not required.

19 Claims, 5 Drawing Sheets

U.S. PATENT DOCUMENTS

| | | |
|---|---|---|
| 5,893,266 A | 4/1999 | Smith et al. |
| 6,016,652 A | 1/2000 | Smith et al. |
| 6,058,697 A | 5/2000 | Smith et al. |
| 6,082,097 A | 7/2000 | Smith et al. |
| 6,085,516 A | 7/2000 | Smith et al. |
| 6,092,366 A | 7/2000 | Smith et al. |
| 6,125,763 A * | 10/2000 | Kline et al. ............... 102/381 |
| 6,499,287 B1 | 12/2002 | Taylor |
| 6,782,693 B1 * | 8/2004 | Floyd ..................... 60/204 |
| 2002/0121081 A1 | 9/2002 | Cesaroni et al. |
| 2003/0093987 A1 | 5/2003 | Taylor |

\* cited by examiner

UNITIZED HYBRID ROCKET SYSTEM

CROSS-REFERENCE TO RELATED APPLICATIONS

This application is a National Stage application of International PCT application No. PCT/US2004/009694, filed on Mar. 29, 2004, which claims the priority to U.S. Provisional application No. 60/458,296, filed on Mar. 28, 2003.

BACKGROUND OF THE INVENTION

This invention relates to a hybrid rocket system useful, for example, to propel a winged suborbital spacecraft, but not limited to that application. In contrast to solid-fuel and liquid-fuel rockets, a hybrid rocket motor uses both types of fuel. That is, a fluid oxidizer such as nitrous oxide ($N_2O$) is used to burn a solid fuel. The oxidizer is held in a pressurized tank, and the solid fuel (such as HTPB, or hydroxyl-terminated polybutadiene) is cast on the inner walls of a hollow, and typically tubular combustion-chamber housing or motor extending rearwardly from the oxidizer tank, and terminating in a throat and nozzle. A pilot-controlled valve admits oxidizer to the housing, and an igniter (such as a spark or flame type) initiates combustion.

This invention is directed to two significant improvements. First, to a simplified method of securing and mounting the rocket to a spacecraft fuselage or associated structure; and second, to an integrated motor construction which sharply limits possible leakage paths for improved reliability and safety.

SUMMARY OF THE INVENTION

The hybrid rocket system of this invention is characterized by use of an oxidizer tank having a cylindrical midsection which can be bonded to a spacecraft inner surface by a layer of elastomeric adhesive. An elongated solid-fuel motor case is mechanically rigidly secured to a central rear surface of the tank, and the case terminates in a throat and nozzle. The elastomeric-adhesive bonding of tank to spacecraft forms the sole support for the rocket system, and separate support for the motor case is not required.

DESCRIPTION OF THE PREFERRED EMBODIMENT

Figure 1:
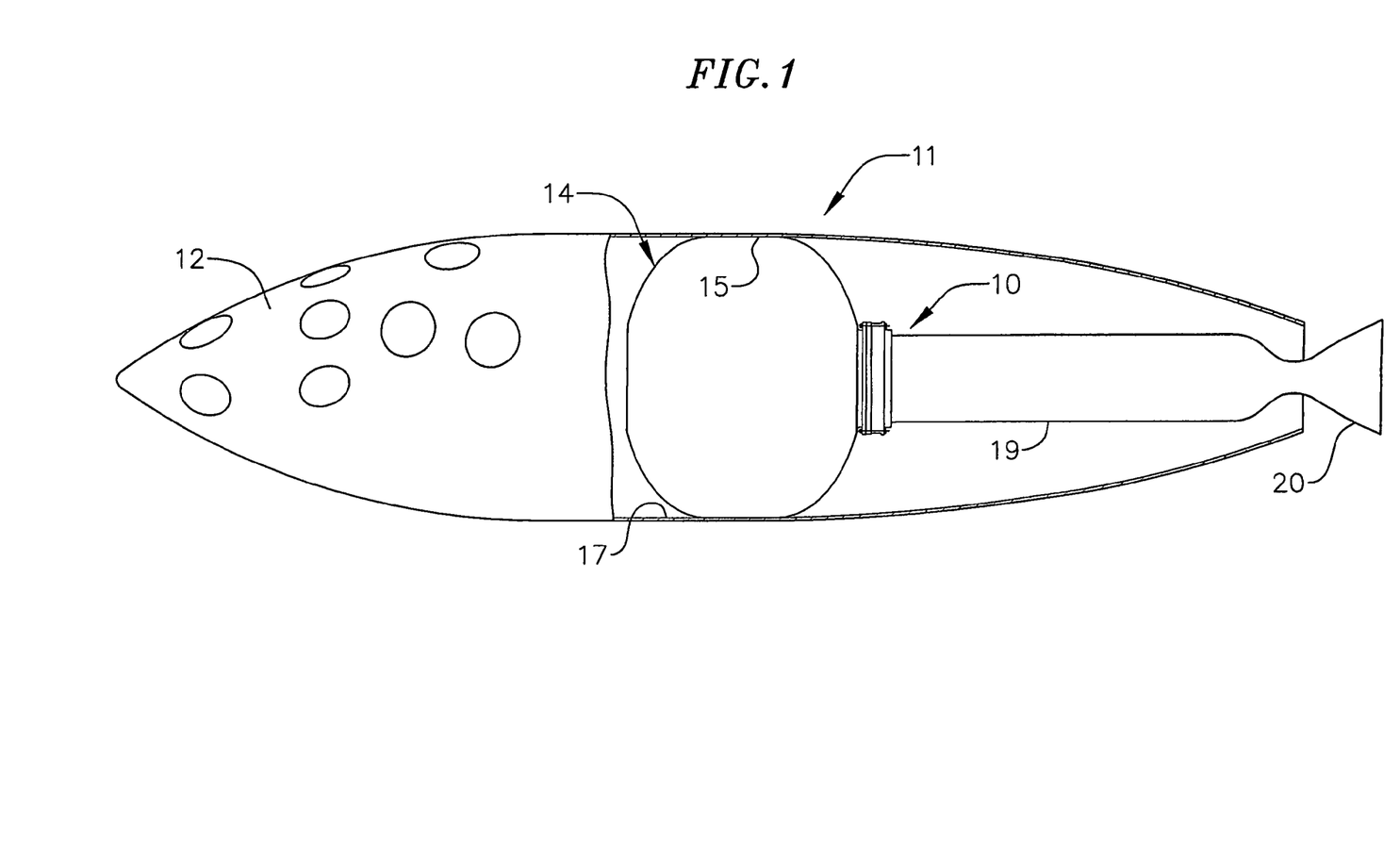
FIG. 1 is a side view of a hybrid rocket as mounted in a winged spacecraft (shown in cross section)
Figure 2:
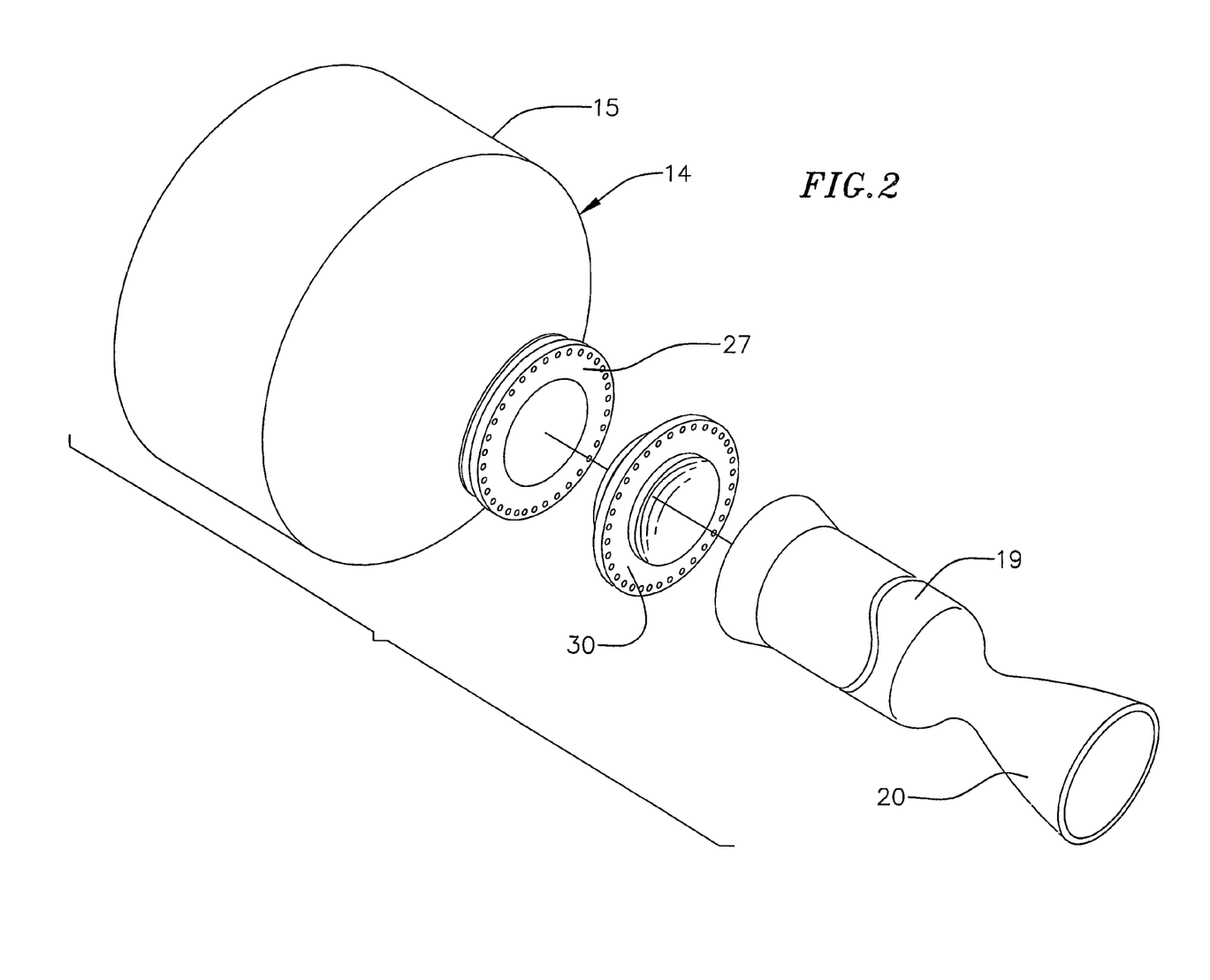
FIG. 2 is an exploded view of components of the rocket.
Figure 3:
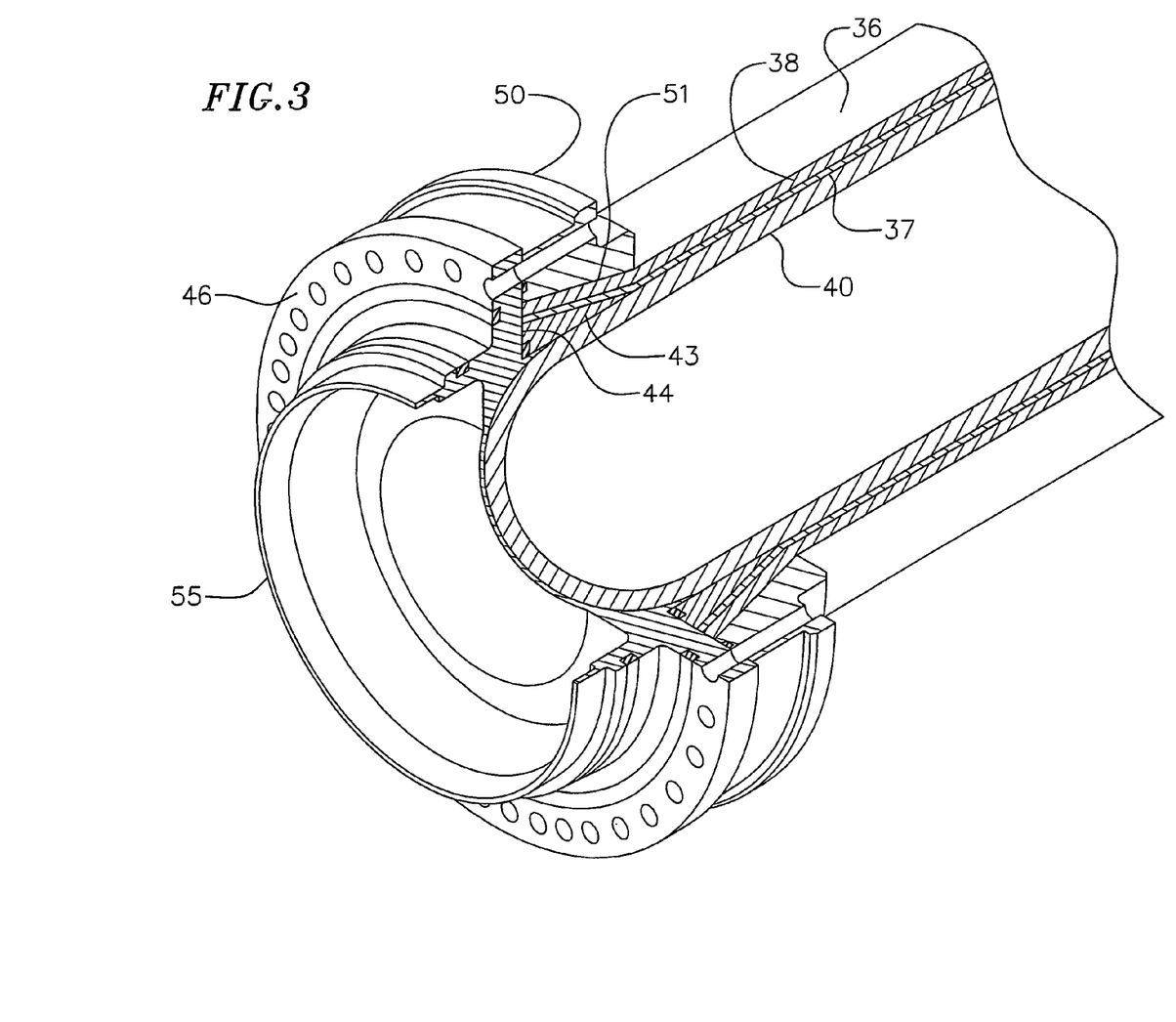
FIG. 3 is a sectional perspective view of a forward end of a solid-fuel motor case of the rocket.

FIG. 1 shows a hybrid rocket 10 as mounted in a winged suborbital spacecraft fuselage 11, partially shown in cross section, and having a pilot compartment 12. The major components of rocket 10 are an oxidizer tank 14 with an elongated cylindrical midsection 15 secured to an inner surface 17 of the fuselage, the tank having a rear bulkhead (described below) to which is secured a cylindrical motor 19 terminating in a nozzle 20. A retractable landing gear and the spacecraft wing and empennage are omitted in FIG. 1 for clarity.

Figure 5:
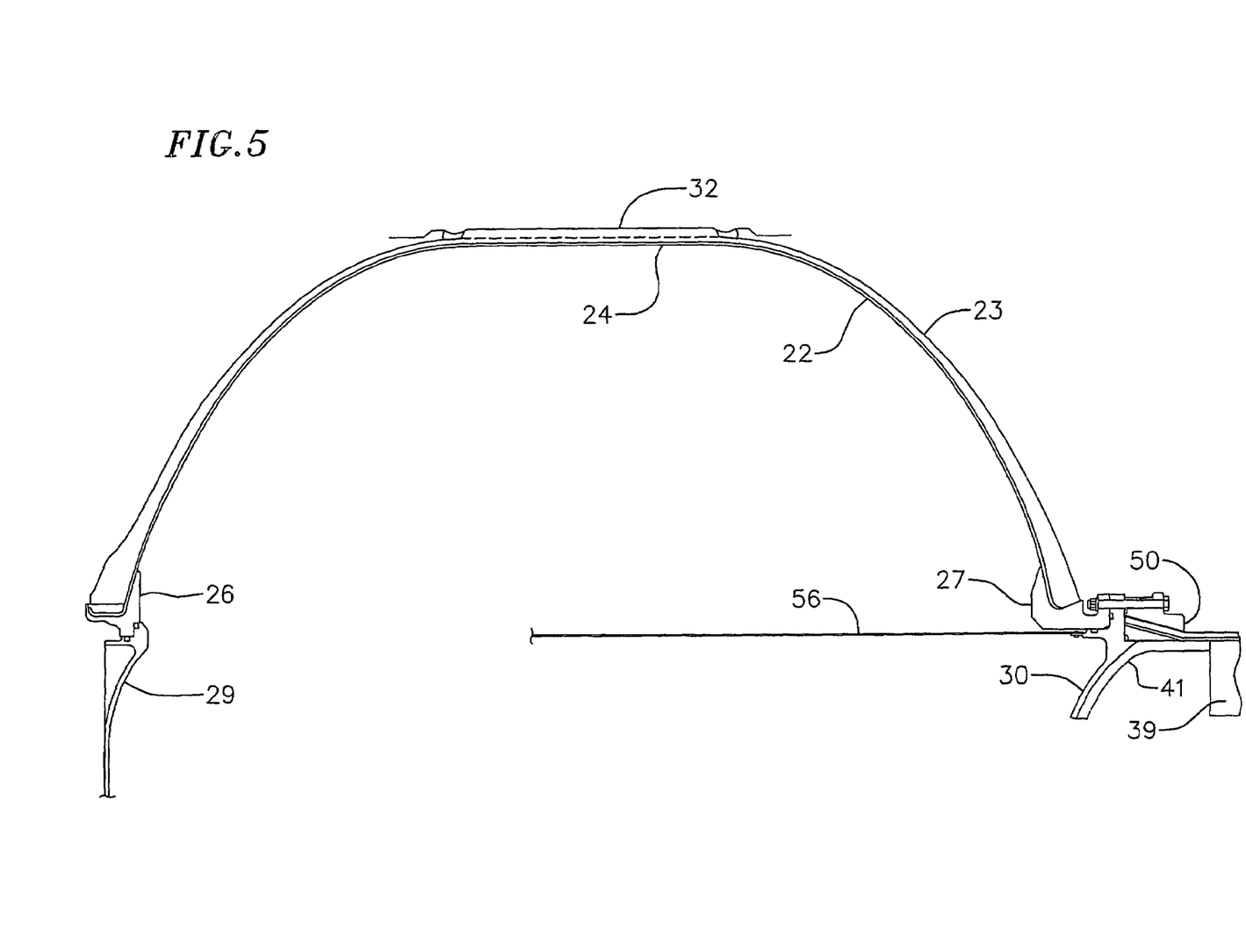
FIG. 5 is a partial sectional view of the oxidizer tank.

Oxidizer tank 14, shown in cross section in FIG. 5, has a relatively thin (e.g., 0.1-0.125 inch) inner liner 22 of an epoxy-fiberglass prepreg composite material. The inner liner is overwound with a layer 23 of graphite-fiber tow coated with an epoxy matrix. The thickness of the tow/epoxy layer is about one-fourth inch in cylindrical midsection 15 of the tank, and gradually thickens toward the opposed tank ends to about 1½ inch where the tank captures and is in sealed engagement with cylindrical forward and rear flanges 26 and 27 (FIG. 5).

Sealingly clamped to forward flange 26 is a forward bulkhead 29 which closes the front end of the tank, but provides a valved inlet (not shown) for loading of oxidizer. Similarly sealingly clamped to rear flange 27 is a forwardly convex rear bulkhead 30 which closes the rear end of the tank. An oxidant delivery valve and igniter system (not shown) are mounted on the rear bulkhead within the tank.

Tank cylindrical midsection 15 is covered by a cylindrical skirt 32 which, in a preferred form, is made of about eleven plies or layers of flexible fiberglass cloth, the adhesively bound plies being oriented at 45 degrees to the longitudinal axis of the tank. The inside diameter of the skirt is slightly larger than the outside diameter of the tank midsection, enabling injection of a thick (about 0.1 inch) layer of an elastomeric adhesive PROSEAL P5890, Class B, made by PRC Desoto is satisfactory) to bond the skirt to the tank.

The thus-bonded skirt and tank make a slip fit within a mating inner cylindrical surface 34 of a fuselage of spacecraft 11, enabling injection of a thin (about 0.02 inch) layer of a rigid bonding adhesive to secure the tank and skirt to the fuselage. An adhesive such as HYSOL 9396 is satisfactory. The tank-skirt and skirt-fuselage bondings form the sole support for rocket 10 within the spacecraft.

Figure 4:
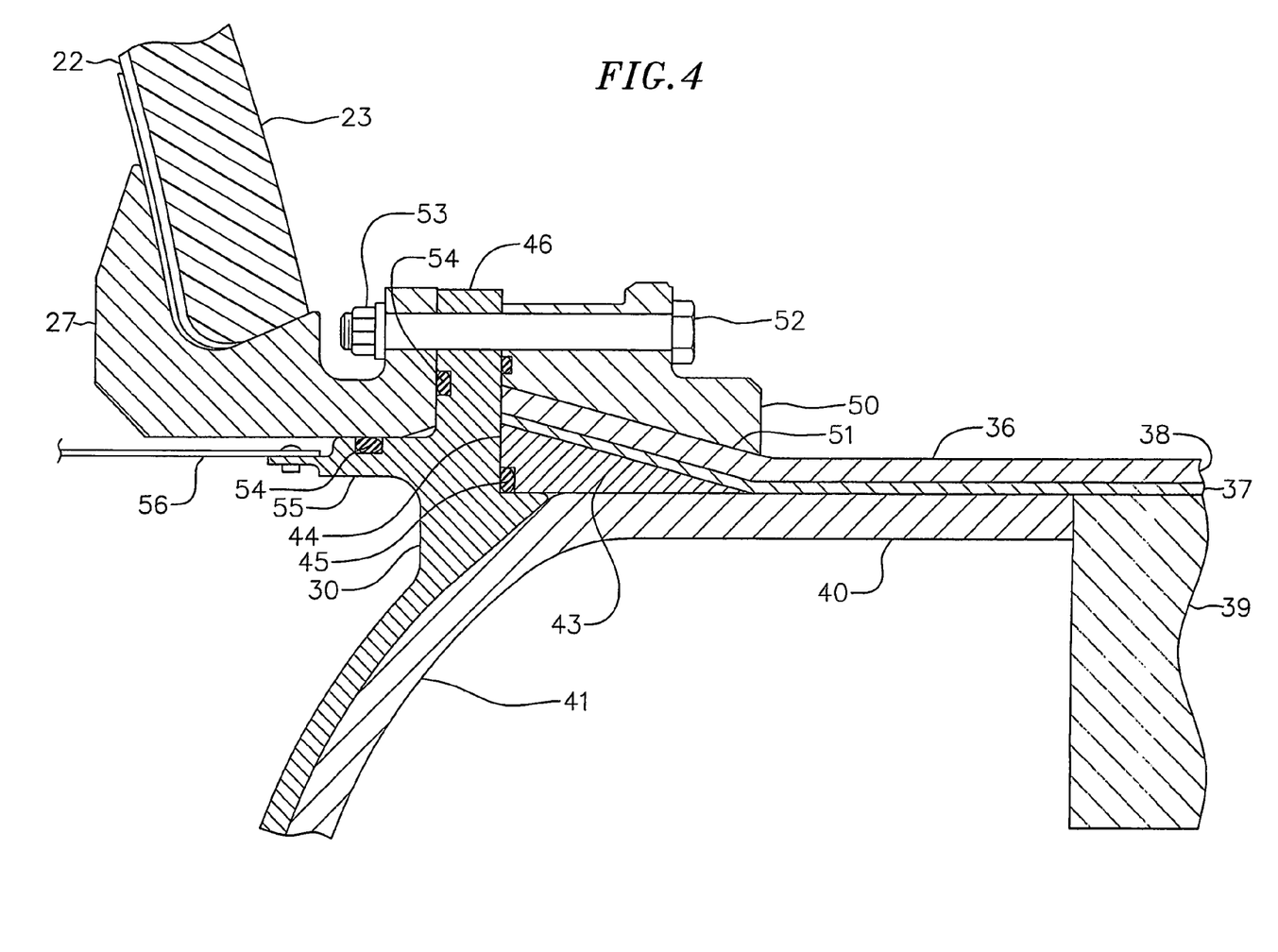
FIG. 4 is a partial sectional view shown by the junction of the motor case with an oxidizer tank.

FIG. 4 is a partial cross-sectional view of the rigid junction of motor 19 to oxidizer-tank rear flange 27 and rear bulkhead 30. Motor case 36 has a silicon-phenolic inner liner 37 of about 0.1-inch thickness, and an outer wrap 38 of carbon-fiber tow of about 0.3-inch thickness. Solid fuel 39 is cast within the case, leaving open portions around the case centerline. A compression-molded head insulation 40 is formed ahead of the solid fuel, and has a forwardly convex front end 41 following a mating curvature of the rear end of bulkhead 30. The forward end of case 36 is outwardly flared to seat against a cylindrical steel wedge 43 of triangular cross section, and having a front surface 44 with an O-ring seal 45 seated against an outwardly extending cylindrical flange 46 on rear bulkhead 30.

An aluminum clamping ring 50 having a forwardly and outwardly tapered inner surface 51 fitted over the forward end of the motor case, and against the rear surface of flange 46. A number of threaded fasteners 52 extend through mating openings in ring 50, flange 46, and flange 27 to nuts 53 to tightly clamp those components together, thereby rigidly securing the motor case to the tank. Additional O-ring seals 54 are seated in flange 46 and a forwardly extending ring 55 formed integrally with the rear bulkhead. A perforated cylindrical tube 56 is secured to ring 55, and extends forwardly within the oxidizer tank to provide a slosh baffle.

The oxidizer tank is loaded with nitrous oxide pressurized to about 700 psi, at which pressure the oxidizer is a liquid. Outward swelling of the pressurized tank is at least partially absorbed by the thick layer of elastomeric adhesive bonding the tank skirt to the fuselage, and this adhesive layer also absorbs and damps motor vibrations.

Apart from cylindrical midsection 15, the oxidizer tank roughly approximates a sphere providing a pressure vessel strong enough to support the loads imposed by a fired motor. This strength permits the motor to be cantilevered off the rear end of the tank, and without further support from the fuselage. This single connection enables easy replacement of the motor (typically a single-use component), as well as accomodating motors of varying length, and reducing the number of possible leakage paths. Further, no additional weight is incurred in motor support, as the strong tank/fuselage mounting supports the entire rocket system.

What is claimed is:

1. In a suborbital spacecraft having a fuselage with a generally central and open interior cylindrical surface, a hybrid-rocket propulsion system, comprising an oxidizer tank having an outer and central cylindrical surface covered by a skirt, and insertable within the fuselage interior surface, the skirt and tank being secured together by an elastomeric means, and an outer surface of the skirt being adhesively secured to the fuselage interior surface; an elongated and generally cylindrical solid-fuel motor case rigidly secured to a central rear surface of the oxidizer tank, the case having a rear end defining a throat, and a nozzle extending behind the fuselage; the case being cantilevered behind the tank, said oxidizer tank providing sufficient support to said motor case for entirely supporting said motor case.

2. The propulsion system of claim 1, wherein the tank has an inner liner of an epoxy-fiberglass composite material, the inner liner being overwound with an outer layer of graphite-fiber tow and an epoxy matrix.

3. The propulsion system of claim 2, wherein the skirt is fiberglass.

4. The propulsion system of claim 3, wherein the elastomeric means is a layer of an elastomeric adhesive bonding the skirt to the tank.

5. The propulsion system of claim 4 wherein the elastomeric adhesive has a thickness of about 0.1 inch.

6. The propulsion system of claim 2, wherein the tank inner liner and outer layer are wound around and secured to forward and rear flanges, the flanges in turn being secured to forward and rear bulkheads respective, the bulkheads sealing the tank.

7. The propulsion system of claim 6, wherein the motor case is rigidly secured to the rear bulkhead by releasable fasteners, enabling replacement of a fired motor case.

8. The propulsion system of claim 1 wherein the elastomeric means and an adhesive adhesively securing the skirt to the fuselage form the sole support of the propulsion system to the fuselage.

9. The propulsion system of claim 1 wherein said motor case is cantilevered from said oxidizer tank and is free from other attachment to the fuselage.

10. The propulsion system of claim 1 wherein said motor case is only secured to said oxidizer tank.

11. In a suborbital spacecraft having a fuselage with a generally central and open interior cylindrical surface, a hybrid-rocket propulsion system, comprising an oxidizer tank having an outer surface covered by a skirt, and insertable within the fuselage interior surface, the skirt and tank being secured together by an elastomeric means, and an outer surface of the skirt being adhesively secured to the fuselage interior surface; a solid-fuel motor case secured to a rear surface of the oxidizer tank, the case having a rear end defining a throat, and a nozzle; the case being cantilevered behind the tank, wherein said oxidizer tank provides sufficient support to said motor case for entirely supporting said motor case.

12. The propulsion system of claim 11, wherein the elastomeric means is a layer of an elastomeric adhesive bonding the skirt to the tank.

13. The propulsion system of claim 12 wherein the elastomeric adhesive has a thickness of about 0.1 inch.

14. The propulsion system of claim 11, wherein the tank has an inner liner of an epoxy-fiberglass composite material, the inner liner being overwound with an outer layer of graphite-fiber tow and an epoxy matrix.

15. The propulsion system of claim 14, wherein the skirt is fiberglass.

16. The propulsion system of claim 14, wherein the tank inner liner and outer layer are wound around and secured to forward and rear flanges, the flanges in turn being secured to forward and rear bulkheads respective, the bulkheads sealing the tank.

17. The propulsion system of claim 11, wherein the motor case is rigidly secured to the rear bulkhead by releasable fasteners, enabling replacement of a fired motor case.

18. The propulsion system of claim 11 wherein the elastomeric means and an adhesive adhesively securing the skirt to the fuselage form the sole support of the propulsion system to the fuselage.

19. The propulsion system of claim 11 wherein said motor case is entirely supported through said oxidizer tank.

* * * * *

UNITED STATES PATENT AND TRADEMARK OFFICE
CERTIFICATE OF CORRECTION

PATENT NO.          : 7,540,145 B2
APPLICATION NO.     : 10/516828
DATED               : June 2, 2009
INVENTOR(S)         : Elbert L. Rutan It is certified that error appears in the above-identified patent and that said Letters Patent is hereby corrected as shown below:

The sheets of drawing consisting of figures 1 and 5 should be deleted to appear as per attached figures 1 and 5.

Signed and Sealed this
Twenty-ninth Day of May, 2012

David J. Kappos
*Director of the United States Patent and Trademark Office*

FIG.1

FIG.5

UNITED STATES PATENT AND TRADEMARK OFFICE
CERTIFICATE OF CORRECTION

PATENT NO.       : 7,540,145 B2                                               Page 1 of 4
APPLICATION NO.  : 10/516828
DATED            : June 2, 2009
INVENTOR(S)      : Elbert L. Rutan

It is certified that error appears in the above-identified patent and that said Letters Patent is hereby corrected as shown below:

Delete the title page and substitute therefore the attached title page consisting of corrected illustrative figure.

The sheets of drawing consisting of figures 1 and 5 should be deleted to appear as per attached figures 1 and 5.

This certificate supersedes the Certificate of Correction issued May 29, 2012.

Signed and Sealed this
Nineteenth Day of June, 2012

David J. Kappos
*Director of the United States Patent and Trademark Office*

(12) United States Patent
Rutan (10) Patent No.: US 7,540,145 B2
(45) Date of Patent: Jun. 2, 2009

(54) UNITIZED HYBRID ROCKET SYSTEM

(75) Inventor: Elbert L. Rutan, Mojave, CA (US)

(73) Assignee: Mojave Aerospace Ventures, LLC, Seattle, WA (US)

( * ) Notice: Subject to any disclaimer, the term of this patent is extended or adjusted under 35 U.S.C. 154(b) by 787 days.

(21) Appl. No.: 10/516,828

(22) PCT Filed: Mar. 29, 2004

(86) PCT No.: PCT/US2004/009694

§ 371 (c)(1),
(2), (4) Date: Nov. 1, 2005

(87) PCT Pub. No.: WO2004/085252

PCT Pub. Date: Oct. 7, 2004

(65) Prior Publication Data

US 2006/0145018 A1    Jul. 6, 2006

Related U.S. Application Data

(60) Provisional application No. 60/458,296, filed on Mar. 28, 2003.

(51) Int. Cl.
*F02K 9/28* (2006.01)
(52) U.S. Cl. ............ 60/251; 60/253; 244/171.1
(58) Field of Classification Search ........... 60/251, 60/253; 244/171.1, 172.3
See application file for complete search history.

(56) References Cited

U.S. PATENT DOCUMENTS

| | | | |
|---|---|---|---|
| 3,068,641 A * | 12/1962 | Fox | 60/207 |
| 3,097,766 A | 7/1963 | Biehl et al. | |
| 3,178,885 A * | 4/1965 | Loughran | 60/251 |
| 3,354,647 A | 11/1967 | Aycock | |
| 3,568,448 A * | 3/1971 | Webb, Jr. | 60/250 |
| 3,969,812 A * | 7/1976 | Beck | 29/421.1 |
| 4,504,530 A * | 3/1985 | Bliley | 428/36.1 |
| 4,561,568 A | 12/1985 | Hoffmeister et al. | |
| 4,577,542 A * | 3/1986 | O'Driscoll | 86/20.12 |
| 4,631,916 A * | 12/1986 | Le Tanter et al. | 60/245 |
| 5,070,691 A * | 12/1991 | Smith et al. | 60/245 |
| 5,101,623 A | 4/1992 | Briley | |
| 5,119,627 A | 6/1992 | Bradford et al. | |
| 5,341,638 A | 8/1994 | Van Name et al. | |
| 5,613,358 A * | 3/1997 | Humiston et al. | 60/250 |
| 5,715,675 A | 2/1998 | Smith et al. | |

(Continued)

OTHER PUBLICATIONS

International Search Report for International PCT Application No. PCT/US2004/09694, dated Sep. 27, 2004, pp. 8.

*Primary Examiner*—William H Rodriguez
(74) *Attorney, Agent, or Firm*—Christie, Parker & Hale, LLP.

(57) ABSTRACT

The hybrid rocket system of this invention is characterized by use of an oxidizer tank having a cylindrical midsection surrounded by a skirt and bonded thereto by a layer of elastomeric adhesive. The skirt outer surface is in turn adhesively secured to a spacecraft inner surface. An elongated solid-fuel motor case is mechanically rigidly secured to a central rear surface of the tank, and the case terminates in a throat and nozzle. The elastomeric-adhesive bonding of tank to skirt, and rigid adhesion of skirt to spacecraft forms the sole support for the rocket system, and separate support for the motor case is not required.

19 Claims, 5 Drawing Sheets

FIG.1

FIG.5